United States Patent

Bock

4,076,389

Feb. 28, 1978

[54] ZOOM LENS MOUNT AND MECHANISM

[75] Inventor: Edward C. Bock, Webster, N.Y.

[73] Assignee: Xerox Corporation, Stamford, Conn.

[21] Appl. No.: 681,371

[22] Filed: Apr. 29, 1976

[51] Int. Cl.$^2$ .................. G02B 15/00; G02B 9/00; G02B 7/02

[52] U.S. Cl. .................. 350/187; 350/206; 350/255

[58] Field of Search .............. 350/187, 184, 185, 186, 350/255, 206

[56] References Cited

U.S. PATENT DOCUMENTS

| | | | |
|---|---|---|---|
| 2,746,350 | 5/1956 | Hopkins | 350/187 |
| 2,782,683 | 2/1957 | Walker | 350/187 |
| 3,185,029 | 5/1965 | Peck | 350/187 |
| 3,482,500 | 12/1969 | Thomas | 350/187 |
| 3,591,256 | 7/1971 | Hoyer | 350/206 |
| 3,631,786 | 1/1972 | Crapsey | 350/187 |

*Primary Examiner*—Verlin R. Pendegrass
*Assistant Examiner*—Donald P. Walsh
*Attorney, Agent, or Firm*—Robert J. Bird

[57] ABSTRACT

A mount and mechanism for a symmetrical zoom lens in which the outer lens elements are stationary relative to the lens housing. The inner elements on one side of the center move in unison on one shaft driven in symmetrically opposite direction relative to another shaft on which the inner lens elements on the other side of the lens center move.

The entire zoom lens housing is mounted for sliding movement, between object and image, on a carriage which is in turn mounted for movement along a stationary frame. The frame includes an iris cam which is in engagement with an iris cam follower which in turn is connected by a linkage to the lens iris to control the lens aperture in response to the axial position along the carriage of the lens housing. The maximum opening of the lens iris is at the highest magnification and the minimum opening of the lens aperture is at the lower magnification.

8 Claims, 6 Drawing Figures

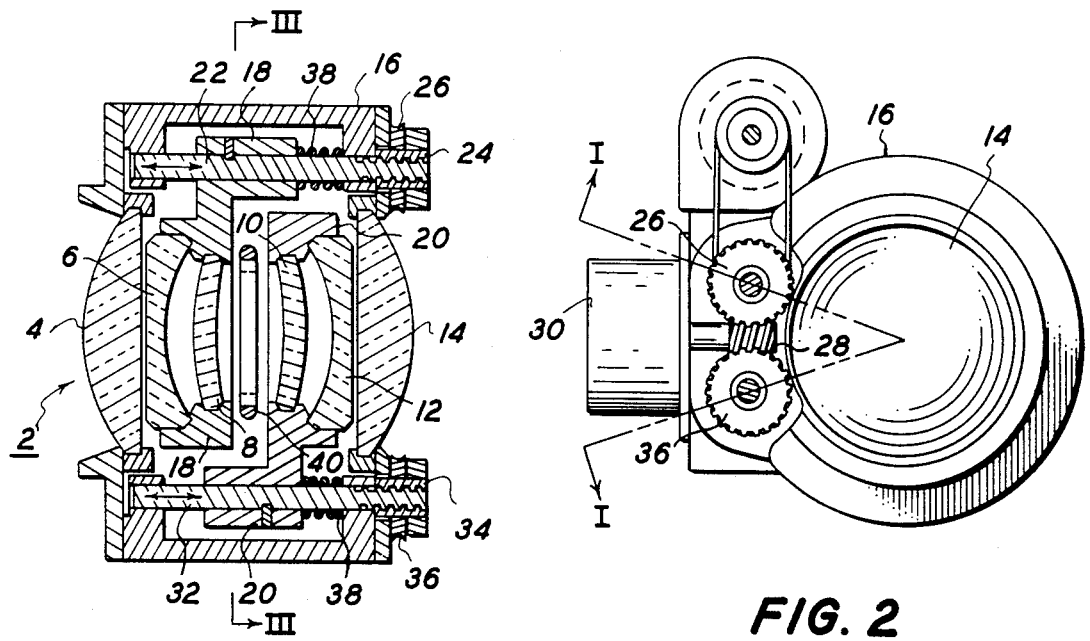
FIG. 1
FIG. 2
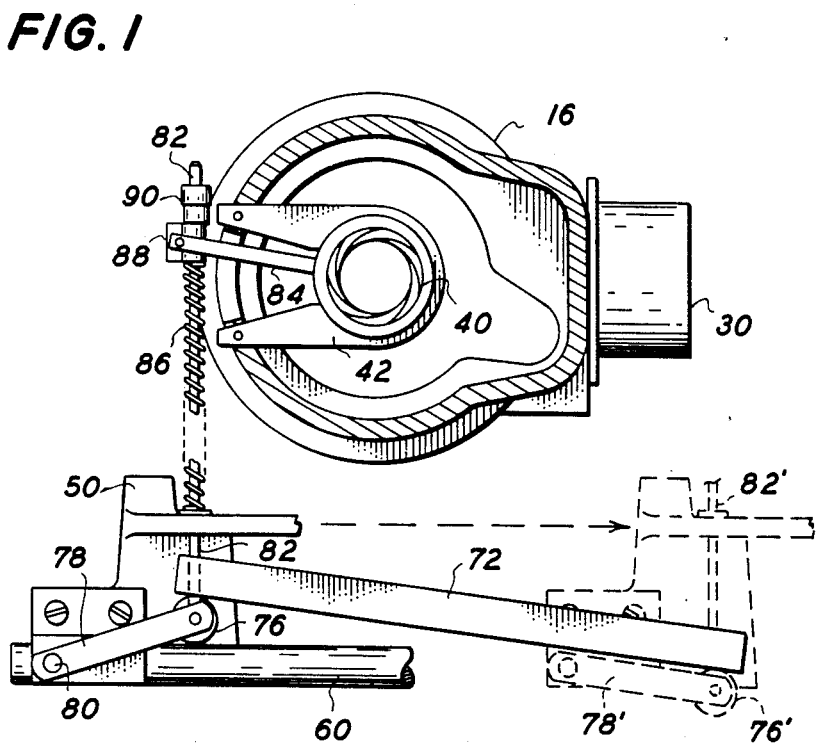
FIG. 3

ZOOM LENS MOUNT AND MECHANISM

BACKGROUND OF THE INVENTION

This invention relates to variable focal length or zoom lenses, and particularly to a mount and mechanism for the operation of a particular type of zoom lens.

The operation of a zoom lens can be thought of as involving two separate functions, though they occur simultaneously:

First, the entire lens is generally moved relative to the object and image to change magnification in accordance with the relationship:

Magnification = $s'/s$ wherein: $s$ — object distance, $s'$ — image distance

Second, compensation is made within the lens to refocus, or maintain in focus, the lens in accordance with the following relationship $(1/s) + (1/s') = 1/f$ wherein: $f$ — lens focal length.

The compensation in focal length, step two mentioned above, is generally made by movement of one or more of the lens elements within or relative to the lens group.

In copending application Ser. No. 663,397 filed by Price and Spurles on Mar. 3, 1976, a symmetrical zoom lens is described in which the outer lens elements remain fixed relative to the lens housing and an inner pair of flint and meniscus elements on each side of the aperture is moved in unison and in symmetry with respect to the opposite pair to effect variation in lens focal length for zooming. The details of that lens are more fully set forth in the above mentioned specification which is hereby incorporated by reference in this specification.

It is an object of this invention to provide a simplified mount and mechanism for a zoom lens.

Another object of this invention is to provide an anti-backlash zoom lens mechanism.

Another object of this invention is to provide a suitable mount and mechanism for a symmetrical zoom lens.

Other objects, advantages, and features of this invention will become apparent from the following more detailed description of an exemplary embodiment given in connection with the accompanying drawing.

DRAWING

FIG. 1 is a sectional view of a zoom lens within a lens housing constructed according to this invention; taken along the line I—I of FIG. 2;

FIG. 2 is a right end view of FIG. 1;

FIG. 3 is a sectional view taken along line III—III of FIG. 1 and showing additional elements operatively connected;

DESCRIPTION

Focal Length Variation

Figure 4:
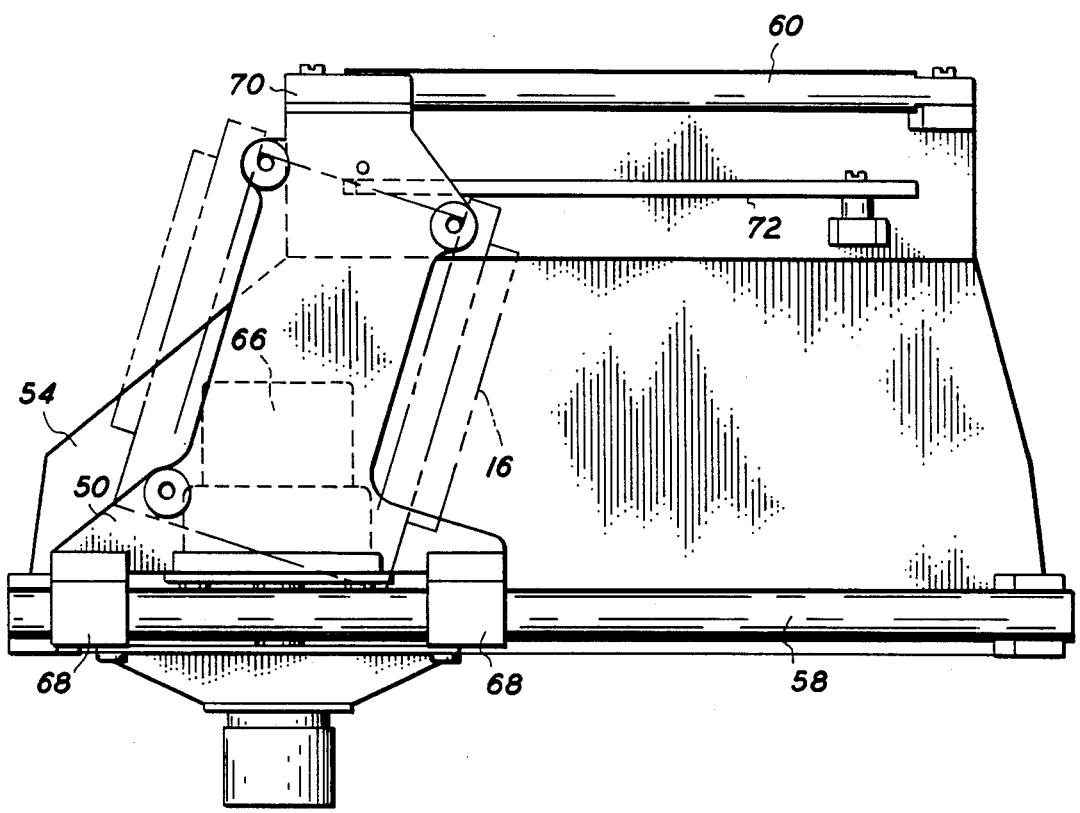
FIG. 4 is a top plan view of a mounting structure and carriage for supporting the lens housing.

The mechanism by which the lens focal length is viewed will be described first. Referring now to FIG. 1, a symmetrical zoom lens is represented generally at 2 and is shown mounted within a lens housing. The zoom lens 2 includes, from left to right, an outer crown element 4, a flint element 6, and a meniscus element 8, all on one side of the central lens aperture. Continuing from left to right, a meniscus element 10, a flint element 12 and an outer crown element 14 are disposed on the other side of the central aperture in symmetry with respect to elements 8, 6, and 4, respectively.

Zoom lens 2 is mounted within a housing 16 with the end crown elements 4 and 14 fixed with respect to the housing. Lens elements 6 and 8 are mounted on a yoke 18 which is disposed for axial movement relative to the lens housing 16. Similarly lens elements 10 and 12 are mounted on an identical and oppositely facing yoke 20 for axial movement relative to the housing 16.

Yoke 18 is fastened, by a suitable fastener, to a drive shaft 22 which is supported at its ends for axial sliding movement relative to housing 16. One end of drive shaft 22 is threaded and mated with an internally threaded drive member 24. Drive member 24 includes a worm wheel 26 which engages a drive worm gear 28 and drive motor 30 (FIG. 2).

Yoke 20 is similarly fastened to a drive shaft 32 which is supported at its end by the housing 16 for axial sliding movement and engages a drive member 34 including a worm wheel 36 which in turn engages the same drive worm gear 28 and drive motor 30.

A compression spring 38 is placed around each of the drive shafts 22 and 32 between its respective yoke 18 and 20 and the lens housing 16, maintaining a bias on the yokes to eliminate thread backlash in the system.

An iris diaphragm 40, also shown in FIG. 3, is mounted in the central aperture of the lens on an iris holder 42. Iris 40 is adjustable from relatively open positions at greater magnifications to relatively closed positions for smaller magnifications.

Magnification Variation

Figure 5:
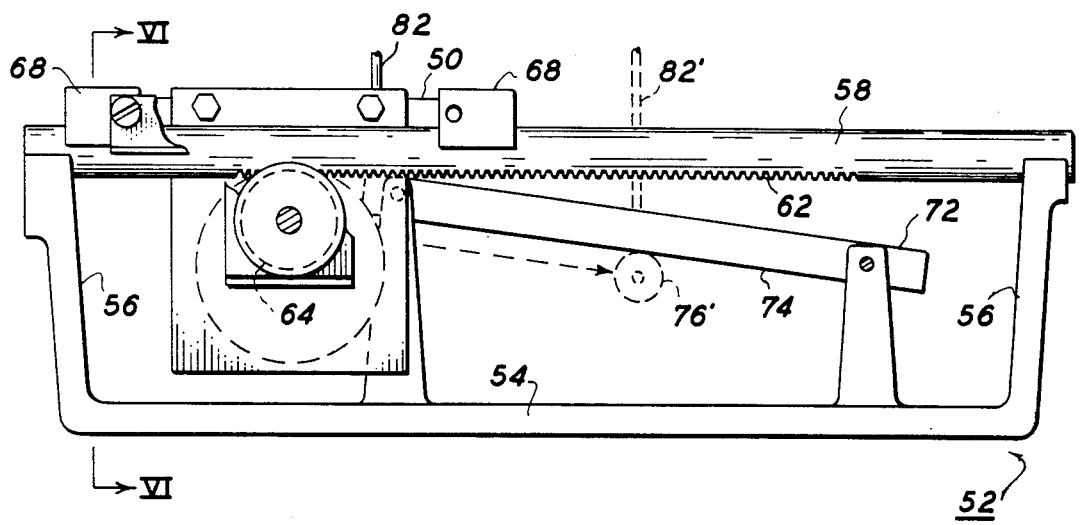
FIG. 5 is a front view of FIG. 4.
Figure 6:
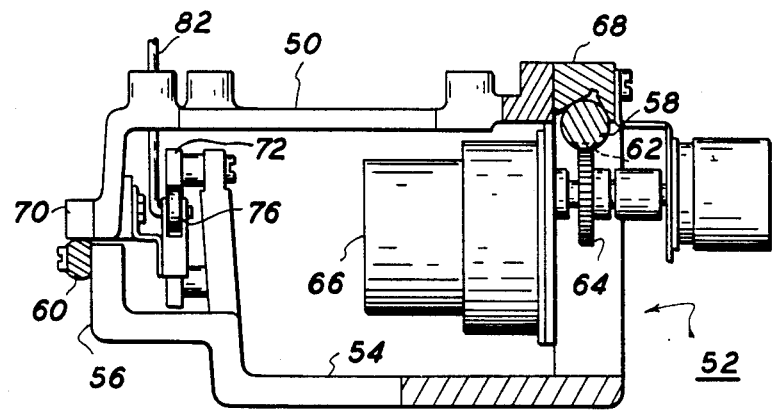
FIG. 6 is a left side partial sectional view of FIG. 5 taken along the line VI—VI of FIG. 5.

The mechanism for varying image magnification will now be described. Referring now to FIGS. 4, 5, and 6, the mount for lens housing 16 is shown in top front and left end views respectively. Lens housing 16 is shown in phantom in the FIG. 4 plan view. Housing 16 is positioned atop a carriage 50 for movement therewith relative to a frame 52. Frame 52 is stationary between object and image locations and includes a suitable base 54 and side walls 56 for the support of a pair of parallel longitudinal rails 58 and 60. The upper surfaces of rails 58 and 60 are bearing surfaces along which carriage 50 is slidable. The underside of rail 58 is a rack 62 in mating engagement with a pinion 64 which in turn is connected to, and driven by, a reduction gear motor 66.

Motor 66 and pinion 64 are mounted on carriage 50 and move with carriage 50 as it "walks" along the rails 58 and 60 by means of the rack and pinion 62, 64. Carriage 50 is mounted atop frame 52 by means of a pair of V-blocks 68 which are integral with carriage 50 and straddle the rail 58 for sliding movement therealong, and a bearing block 70, also integral with carriage 50 and slidably mounted on the rail 60.

An iris cam member 72 is fixedly mounted relative to the frame 52. Cam 72 is a straight bar providing an inclined cam surface 74 on its underside. A cam follower 76, in the form of a roller, engages the underside cam surface 74. Referring now also to FIG. 3, cam follower 76 is mounted to carriage 50 by means of an articulated arm 78 by which follower 76 is free to move up and down about a pivot pin 80 while being carried along with carriage 50. Cam follower 76 is also connected to a rod 82 which extends from the follower 76, up through carriage 50, and to the lens assembly where it is connected to an articulated lever 84 which in turn is directly connected to the iris diaphragm 40. A compression spring 86 surrounds the rod 82 and is positioned between the carriage 50 and a slide block 88 by which the articulated lever 84 is operatively connected to rod 82. An adjusting nut 90 is threaded onto the rod 82 for assembly of the linkage and for adjustment of the lever 84 and iris 40. The compression spring 86 provides the necessary bias to hold cam follower 76 firmly against the cam surface 74.

With reference to FIG. 3, the cam and follower arrangement shown in actual engagement with the rod 82 corresponds to the wide open position of the lens iris diaphragm 40 for 1X magnfication. The cam and follower arrangement represented at the right end of cam 72 corresponds to a relatively closed position of iris diaphragm 40 for some smaller image magnification. It is to be noted that the part of FIG. 3 relating to the cam and follower mechanism is not shown in its true orientation relative to the lens housing 16. It is shown "swung out" as it were, from behind the paper 90° to the plane of the paper, to illustrate the cooperation between cam, cam follower and lens iris.

In FIG. 4, lens housing 16 is shown canted with respect to the rails 58 and 60. This is to maintain edge registration of the image throughout the zoom range in the embodiment shown here. Of course, this feature is not essential in the present invention.

Motor 30 for varying lens focal length and motor 66 for varying systems magnification are preferably continuous running low-inertia synchronous motors, connected to potentiometers to limit their revolutions to predetermined numbers on a known way. Motors 30 and 66 may also be stepper motors. The details of the motor-potentiometer drive are not essential to an understanding of the present invention. Several known arrangements might be used to effect the desired drive of this system.

The foregoing description of an embodiment of this invention is given by way of illustration and not of limitation. The concept and scope of the invention are limited only by the following claims and equivalents thereof which may occur to others skilled in the art.

What is claimed is:

1. A mount and mechanism for a compound zoom lens including:
    a frame supporting a pair of parallel longitudinal rails,
    a stationary cam mounted on said frame and inclined relative to the longitudinal rails thereof,
    a carriage mounted on said rails for movement therealong relative to said frame and said cam,
    first motor means operatively connected to said carriage to effect movement thereof along said rails,
    a lens housing defining a lens aperture on an optical axis and mounted on said carriage for movement therewith, said lens housing supporting a pair of drive shafts extending parallel to said optical axis,
    a first lens holder to support a lens element and operatively connected to one of said drive shafts for axial movement within said housing,
    a second lens holder to support a lens element and operatively connected to the other of said drive shafts for axial movement within said housing,
    said drive shafts being operatively connected to a second motor means for movement in opposite directions relative to each other so that said lens holders move in opposite directions within said housing,
    an iris diaphragm operatively connected to said lens housing and disposed about the aperture thereof to define an adjustable lens aperture stop, said iris diaphragm operatively connected to a diaphragm linkage to open and close said iris diaphragm,
    said diaphragm linkage including a cam follower in operative engagement with said stationary cam so that said diaphragm linkage is responsive to the longitudinal position of said carriage relative to said frame to determine the adjustment of said iris diaphragm.

2. A mount and mechanism for a compound zoom lens as defined in claim 1 in which one of said longitudinal rails includes a rack and said first motor means includes a pinion engaging said rack to drive said carriage along said rails, and said drive shafts are in operative engagement with a worm gear operatively connected to said second motor means.

3. A mount and mechanism for a compound zoom lens as defined in claim 2 in which said first and second lens holders are identical elements and are disposed in symmetry relative to the central aperture stop of said lens.

4. A mount and mechanism for a compound zoom lens as defined in claim 3 in which said first and second lens holders each support a pair of lens elements for symmetrical movement along said optical axis toward and away from the central aperture stop of said lenses.

5. A mount and mechanism for a compound zoom lens including:
    a lens housing defining a lens aperture on an optical axis and supporting a pair of drive shafts within said housing and extending parallel to said optical axis for axial movement relative to said housing,
    a first lens holder connected to one of said drive shafts for axial movement therewith,
    a second lens holder connected to the other of said drive shafts for axial movement therewith, and
    a reversible motor operatively connected to said drive shafts to simultaneously move said drive shafts and said lens holders axially in opposite directions relative to each other,
    said lens housing being adapted to stationarily support thereon an outer lens element at each end of said lens aperture, and
    said lens holders each being adapted to support at least one lens element for movement therewith.

6. A mount and mechansim for a compound zoom lens as defined in claim 5 in which said reversible motor is operatively connected to said drive shafts by means of an intermediate worm gear in engagement with a worm wheel which is in turn internally threaded to said drive shaft to effect axial movement of said drive shaft when said worm wheel is in rotation.

7. A mount and mechanism for a symmetrical compound zoom lens system including:
    a lens housing defining a lens aperture on an optical axis supporting a pair of drive shafts within said housing and extending parallel to said optical axis,
    a first lens holder operatively connected to one of said drive shafts for axial movement within said housing,

- a second lens holder, similar to the first and in symmetry with respect thereto, operatively connected to the other of said drive shafts for axial movement within said housing,
- said axial movements of said first and second lens holders being equal and opposite in magnitude and direction so that symmetry in the lens system is maintained,
- a reversible motor operatively connected to both of said drive shafts to effect said axial movements of said first and second lens holders.

8. A mount and mechanism for a compound zoom lens including:
- a frame supporting a pair of parallel longitudinal rails, one of said rails including a rack extending therealong,
- a stationary cam member mounted on said frame and extending longitudinally thereof, said cam member being inclined relative to the longitudinal rails of said frame,
- a carriage mounted on said rails for movement therealong relative to said frame and said cam member,
- motor means operatively connected to said carriage, said motor means including a pinion engaging said rack to effect movement of said carriage along said rail,
- a lens housing mounted on said carriage for movement therewith, said lens housing defining a lens aperture and including an aperture iris diaphragm,
- said iris diaphragm operatively connected to a diaphragm linkage to effect the alternate opening and closing of said iris diaphragm,
- said diaphragm linkage including a cam follower in operative engagement with said stationary cam member so that said diaphragm linkage is responsive to the longitudinal position of said carriage relative to said frame to determine the adjustment of said iris diaphragm.

* * * * *